United States Patent [19]

Yamamoto et al.

[11] 4,417,019

[45] Nov. 22, 1983

[54] POLYOLEFIN MOLDING COMPOSITION CONTAINING CARBOXYLIC ACID-MODIFIED POLYOLEFIN, GLASS FIBERS AND CALCIUM-SILICATE USEFUL FOR WELDING

[75] Inventors: Noboru Yamamoto, Tokyo; Keiichi Morikubo, Ooi; Masato Komatsu, Hannou; Kazuo Sei, Yokohama, all of Japan

[73] Assignee: TOA Nenryo Kogyo Kabushiki Kaisha, Tokyo, Japan

[21] Appl. No.: 405,495

[22] Filed: Aug. 5, 1982

[30] Foreign Application Priority Data

Jul. 9, 1981 [JP] Japan ................... 56-139806

[51] Int. Cl.$^3$ .............. C08L 23/26; C08K 7/10; C08K 3/40; C08K 7/14
[52] U.S. Cl. ................... 524/456; 524/505; 524/517; 524/522; 524/549; 524/556
[58] Field of Search ............ 524/456, 522, 562, 556, 524/505, 5, 517, 549

[56] References Cited

U.S. PATENT DOCUMENTS

| | | | |
|---|---|---|---|
| 3,764,576 | 10/1973 | Russo | 524/112 |
| 3,856,544 | 12/1974 | Benner et al. | 106/120 |
| 4,101,334 | 7/1978 | Hill et al. | 106/90 |
| 4,172,063 | 10/1979 | O'Brill | 524/5 |

FOREIGN PATENT DOCUMENTS 55-7551 1/1980 Japan ................... 524/5
1186230 4/1970 United Kingdom .

OTHER PUBLICATIONS

Derwent Abs. 90320A/50 Kanebo KK Nov. 1978, J53127532.
Derwent Abs. 42117C/24 Kanebo KK Jan. 1980, J55007582.
Derwent Abs. 71555W/43 (7-75) Mitsubishi (J50089448).
Chem Abs. 97-39871n Tokuyama Soda Co. JP82-49624, Mar. 1982.
Chem. Abs. 112210e, vol. 85 (1976) Hamada JP76-76318.
Chem. Abs. 93-187437 (1980) Asahi-Dow JP78/154904, Jun. 1980.
Chem. Abs. 91-212324 (1979) Sato et al. JP79/90320, Jul. 1979.

*Primary Examiner*—Melvyn I. Marquis
*Assistant Examiner*—Herbert J. Lilling
*Attorney, Agent, or Firm*—Robert L. Graham

[57] ABSTRACT

An improved molding compound comprising a polyolefin modified with an unsaturated carboxylic acid, and has dispersed therein a filler material comprising a mixture of glass fiber and calcium silicate. In one embodiment the molding compound also includes an ethylene-α-olefin copolymer rubber.

14 Claims, No Drawings

POLYOLEFIN MOLDING COMPOSITION CONTAINING CARBOXYLIC ACID-MODIFIED POLYOLEFIN, GLASS FIBERS AND CALCIUM-SILICATE USEFUL FOR WELDING

BACKGROUND OF THE INVENTION

The present invention relates to an improved polyolefin composition which produces moldings with improved dimensional stability and mechanical properties, particularly improved weld strength, low warpage, smooth appearance, and improved heat resistance, without impairing the outstanding chemical stability and moldability inherent in polyolefins.

Heretofore, polyolefins have been used as molding materials on account of high tensile strength, stiffness, and heat resistance attributable to high crystallinity and outstanding electrical properties and chemical stability attributable to resin structure. However, much higher stiffness and heat resistance are required for application areas where the moldings are used as mechanical parts or structural member or used in a high-temperature environment. In order to improve the stiffness and heat resistance of crystalline polyolefins, it is known to incorporate an inorganic filler such as talc, mica, and glass fiber. When a polyolefin is incorporated with talc or mica, the resulting composition is not sufficient in stiffness at high temperatures. When a polyolefin or modified polyolefin is incorporated with glass fiber, the resulting composition is greatly improved in stiffness and heat resistance, but suffer from disadvantages. That is, the moldings made therefrom have great warpage due to anisotropic molding shrinkage caused by orientation of glass fiber and have welds with decreased strength. Such welds are easy to break in moldings having self-tapping bosses or openings. In addition, glass fiber appears as streaks on the surface of moldings, making the appearance poor and the surface rough. The rough surface impairs printability and resistance to hot water.

In order to improve the stiffness at high temperature, molding shrinkage, impact strength, and external appearance, there have been proposed several polyolefin compositions incorporated with powdery inorganic compounds such as glass fiber, calcium carbonate, barium carbonate, and "Shirasu" balloon. Known such compositions include a composition of unmodified carboxylic acid-modified polyolefin containing 3 to 40 wt% (based on the composition) of glass fiber and 10 to 30 wt% (based on the composition of an inorganic compound selected from calcium carbonate, barium carbonate, or "Shirasu" balloon, a reinforced polyolefin resin composition comprising glass fiber and non-reinforcing particulate inorganic compound, as disclosed in Japanese Patent Laid Open No. 89448/12975, and a polyolefin composition incorporated with talc powder filler, glass fiber, and synthetic or natural rubber, as disclosed in Japanese Patent Laid-Open No. 136736/1976.

These compositions are superior in warpage and external appearance to a polyolefin composition reinforced with glass fiber alone, and in impact resistance to a polyolefin composition incorporated with rubber. Nevertheless, the stiffness at high temperature, warpage, and weld strength have not been improved sufficiently for many applications.

SUMMARY OF THE INVENTION

It has been discovered that when a polyolefin modified with an unsaturated carboxylic acid has incorporated therein glass fiber and fibrous calcium silicate, the two fillers exhibit a synergistic effect in providing the composition with improved stiffness at high temperature, low warpage, and improved weld strength. The composition is further improved in impact resistance by incorporating ethylene-α-olefin copolymer rubber.

In its broadest sense, the composition of the present invention comprises (a) a polyolefin modified with an unsaturate carboxylic acid or a derivative thereof, or a mixture of said modified polyolefin and an unmodified polyolefin, (b) glass fiber, and (c) fibrous calcium silicate. In another embodiment the composition comprises (a) a polyolefin modified with an unsaturated carboxylic acid or a derivative thereof, or a mixture of said modified polyolefin and an unmodified polyolefin (b) glass fiber, (c) fibrous calcium silicate, and (d) ethylene-α-olefin copolymer rubber.

DESCRIPTION OF THE PREFERRED EMBODIMENTS

The polyolefin usable in the composition of this invention includes low density polyethylene, linear low density polyethylene, medium and high density polyethylene, polypropylene, poly-1-butene, poly-4-methyl-1-pentene, ethylene-propylene block or random copolymer, ethylene-1-butene copolymer, propylene-1-butene copolymer, and mixtures thereof. Preferable among them is crystalline ethylene-propylene block or random copolymer containing less than 20 wt% of ethylene. These polyolefins should preferably have an MI of 0.5 to 50 g/10 min.

The unsaturated carboxylic acids used to modify the polyolefins includes, for example, acrylic acid, methacrylic acid, maleic acid, fumaric acid, citraconic acid, itaconic acid, endo-bi-cyclo[2,2,1]-1,4,5,6,7,7-hexachloro-5-heptene-2,3-dicarboxylic acid, endo-bi-cyclo[2,2,1]-5-heptene-2,3-dicarboxylic acid, and cis-4-cyclohexene-1,2-dicarboxylic acid. The derivatives of the unsaturated carboxylic acid include acid anhydrides and esters such as maleic anhydride, citraconic anhydride, endo-bi-cyclo[2,2,1]-1,4,5,6,7,7-hexa-chloro-5-heptene-2,3-dicarboxylic acid anhydride, endo-bi-cyclo[2,2,1]-5-heptene-2,3-dicarboxylic acid anhydride, cis-4-cyclohexene-1,2-dicarboxylic acid anhydride, methyl acrylate, methyl methacrylate, ethyl acrylate, ethyl methacrylate, butyl acrylate, butyl methacrylate, and maleate esters (monoester and diester). Preferable among these unsaturated carboxylic acids or derivatives thereof are maleic anhydride and endo-bi-cyclo[2,2,1]-5-heptene-2,3-dicarboxylic acid anhydride.

The aforesaid polyolefins can be modified by known methods. For example, such modification can be accomplished by heating a polyolefin and an unsaturated carboxylic acid or a derivative thereof in the presence or absence of a solvent, with or without a reaction initiator such as an organic peroxide.

The unsaturated carboxylic acid or derivative thereof should preferably be added in an amount of 0.001 to 5 wt%, preferably 0.05 to 1 wt%, to the polyolefin. If the quantity added is less than 0.001 wt%, the modifying effect is not sufficient, and if it exceeds 5 wt%, no more improvement is made but discoloration and degradation occur.

The aforesaid mixture of modified polyolefin and unmodified polyolefin is obtained by blending the aforesaid modified polyolefin with an unmodified polyolefin of the same or different kinds.

The unsaturated carboxylic acid or derivative thereof should preferably be added in an amount of 0.001 to 3 wt%, preferably 0.05 to 1 wt%, to the polyolefin mixture.

The glass fiber used in this invention is glass roving, glass chopped strand, or glass milled fiber which are commonly used for reinforcement of resin. They should preferably be surface treated with, for instance, an organosilane in order to improve the affinity for the resin.

The fibrous calcium silicate used in this invention includes, for example, a natural product such as Wollastonite or a synthetic product having an average particle size of 1 to 100 microns and an aspect ratio of 3 to 30. Fibrous calcium silicate having a high aspect ratio is effective to improve the stiffness.

The ethylene-α-olefin copolymer rubber used in this invention includes copolymer rubber of ethylene and α-olefin such as propylene, 1-butene, and 1-hexene, and a terpolymer rubber (referred to as EPDM hereinafter) composed of ethylene, propylene, and non-conjugated diene such as ethylidene-norbornene and dicyclopentadiene. Preferable among them is ethylene-propylene copolymer rubber (referred to as EPR hereinafter) and EPDM. These ethylene-α-olefin copolymer rubber should preferably contain 20 to 90 wt% of ethylene and have a Mooney viscosity of 10 to 120 (JIS K-6300, $ML_{1+4}$, 100° C.).

The composition of this invention should preferably have the blending ratio of (1) 30 to 94 wt% of a modified polyolefin modified with an unsaturated carboxylic acid or a derivative thereof or a mixture of said modified polyolefin and an unmodified polyolefin, 1 to 30 wt% of glass fiber, and 5 to 40 wt% of fibrous calcium silicate, or (2) 100 parts of a composition composed of 30 to 94 wt% of a modified polyolefin modified with an unsaturated carboxylic acid or a derivative thereof or a mixture of said modified polyolefin and an unmodified polyolefin, 1 to 30 wt% of glass fiber, and 5 to 40 wt% of fibrous calcium silicate, and 1 to 40 parts of ethylene-α-olefin copolymer rubber. If the content of glass fiber is less than specified as above, no sufficient improvement is made in stiffness at high temperature; and if it is excessive, the weld strength decreases, the appearance and surface smoothness are impaired, and moldability becomes poor.

If the quantity of fibrous calcium silicate is less than specified above, the synergistic effect with glass fiber is not sufficient to improve warpage and weld strength; if it is excessive, the tensile strength, impact resistance, and moldability are adversely affected. If the quantity of the ethylene-α-olefin copolymer rubber is less than specified above, the effect to improve impact strength is not sufficient; and if it is excessive, stiffness and moldability are adversely affected.

The composition of the invention can be prepared by mixing preliminarily modified polyolefin, unmodified polyolefin, glass fiber, fibrous calcium silicate, and ethylene-α-olefin copolymer rubber using a Henschel mixer or drum tumbler, and then melting and kneading the mixture using a Banbury mixer, rolls, a twin extruder, or the like. However, this invention is not limited to these methods. The composition of this invention may be incorporated with stabilizers such as antioxidants and ultraviolet rays absorbers, and additives such as slipping agents, antistatic agents, and pigments.

The composition of this invention is superior in moldability and demoldability in injection molding; and it can be also used for extrusion molding. The resulting moldings are superior in mechanical strength, weld strength, warpage, heat resistance, stiffness, and smooth appearance, as well as chemical resistance inherent in polyolefin.

They are expected to find uses in many application areas, particularly automotive dash-board, machine parts, and structural members having self-tapping bosses or complicated shape which need high weld strength.

The invention is described in detail with reference to the following examples. Percent (%) used in the examples is percent by weight.

The test methods used in the examples are explained in the following.

(1) MI: ASTM D-1238
(2) Tensile strength: ASTM D-638
(3) Heat distortion temperature: ASTM D-648
(4) Flexural modulus: ASTM D-790
(5) Izod impact strength: ASTM D-256 3.2 mm thick test piece, with notch
(6) Weld strength retention ratio: A test piece for tensile test in conformity with No. 1 of ASTM D-638 is injection-molded with two side gates at the longitudinal ends. The resulting test piece is subjected to tensile test according to ASTM D-638, and the strength measured is regarded as weld strength.
(7) Warpage: A circular test piece, 1.5 mm thick and 150 mm in diameter, is molded by means of the center direct gate. After standing at 20° C. and 65% RH for 24 hours, the test piece is placed on a flat board and height (h) from the board is measured and warpage is calculated as follows:

Warpage (%) = $(H-1.5)/150 \times 100$

EXAMPLE 1

Modified ethylene-propylene block copolymer (referred to as modified PP-I) was prepared by reacting ethylene-propylene block copolymer (MI-1.0; ethylene content=7.0%) with endo-b-icyclo-[2,2,1]-5-heptene-2,3-dicarboxylic acid anhydride (referred to as himic acid hereinafter).

The quantity of himic acid anhydride added was 0.3%.

This modified PP-I was incorporated with glass fiber chopped strand (6 mm long and 13 microns in diameter) and fibrous calcium silicate (Wollastonite) having an average particle diameter of 9 microns and an aspect ratio of 3 to 30 at the ratios as shown in Table 1. The components were mixed with a Henschel mixer and the resulting mixture was then melted and kneaded at 200° to 250° C. using an extruder. The resulting pellets were injection molded into test pieces as 230° C. under 900 kg/cm². The resulting test pieces were measured for tensile strength, heat distortion temperature, flexural modulus, Izod impact strength, weld strength retention ratio, and warpage. The results are shown in Table 1 (Experiment Nos. 1–2)

For comparison, the same experiments were carried out except that the fibrous calcium silicate was replaced by calcium carbonate. The results are shown in Table 1 (Experiment No. 3).

EXAMPLE 2

Modified polypropylene (referred to as modified PP-II) was prepared by reacting polypropylene homopolymer (MI=1.0) with himic acid anhydride. The quantity of himic acid anhydride added was 1.0%.

This modified PP-II was incorporated with polypropylene (MI=15), and the same glass fiber and fibrous calcium silicate as used in Example 1 at the ratios as shown in Table 2. Test pieces were molded and their properties were measured under the same conditions as Example 1. The results are shown in Table 2 (Experiment Nos. 4-8).

For comparison, the same experiments were carried out except that the fibrous calcium silicate was replaced by mica (average particle diameter=100 microns, aspect ratio=10 to 100), talc (average particle diameter=10 microns, aspect ratio=3 to 10), or calcium carbonate (average particle diameter=4 microns). The results are shown in Table 2 (Experiment Nos. 9-11).

EXAMPLE 3

Modified ethylene-propylene block copolymer (referred to as modified PP-III) was prepared by reacting ethylene-propylene block copolymer (MI=1.0) with himic acid anhydride. The quantity of himic acid anhydride added was 1.0%.

This modified PP-III was incorporated with ethylene-propylene block copolymer (MI=15, ethylene content=7%), ethylene-propylene random copolymer (MI=9, ethylene content=2%), and the same glass fiber and fibrous calcium silicate as used in Example 1 at the ratios as shown in Table 3. Test pieces were molded and their properties were measured under the same conditions as Example 1. The results are shown in Table 3 (Experiment Nos. 12-14).

For comparison, the same experiments were carried out except that the fibrous calcium silicate was replaced by talc used in Example 1 and barium sulfate (average particle diameter=0.6 micron). The results are shown in Table 3 (Experiment Nos. 15-16).

EXAMPLE 4

Modified PP-III and ethylene-propylene block copolymer used in Example 3, glass fiber and fibrous calcium silicate used in Example 1, and EPR (ethylene content=75%, Mooney viscosity=70) were blended at the ratios shown in Table 4. Test pieces were molded and their properties were measured under the same conditions as Example 1. The results are shown in Table 4 (Experiment Nos. 17-19).

For comparison, the same experiments were carried out except that the modified PP-III was not used and the fibrous calcium silicate was replaced by talc used in Example 2. The results are shown in Table 4 (Experiment No. 20).

TABLE 1

|  | Experiment No. | | |
|---|---|---|---|
|  | 1 | 2 | 3* |
| Modified PP-I (%) | 80 | 70 | 70 |
| Glass fiber (%) | 10 | 20 | 20 |
| Fibrous calcium silicate (%) | 10 | 20 | — |
| Calcium carbonate (%) | — | — | 10 |
| Tensile strength (kg/cm$^2$) | 560 | 860 | 780 |
| Heat distortion temperature (°C.) | 149 | 162 | 152 |
| Flexural modulus (kg/cm$^2$) | 42,000 | 58,000 | 51,000 |
| Izod impact strength (20° C., kg-cm/cm) | 4.6 | 6.2 | 5.5 |
| Weld tensile strength retention ratio (%) | 85 | 50 | 35 |
| Warpage (%) | 10 | 8 | 10 |

*Comparative Example

TABLE 2

|  | Experiment No. | | | | | | | |
|---|---|---|---|---|---|---|---|---|
|  | 4 | 5 | 6 | 7 | 8 | 9* | 10* | 11* |
| Modified PP-II (%) | 10 | 15 | 15 | 15 | 25 | 15 | 15 | 15 |
| Polypropylene homopolymer (%) | 65 | 65 | 55 | 45 | 45 | 55 | 55 | 55 |
| Glass fiber (%) | 5 | 10 | 10 | 10 | 20 | 10 | 10 | 10 |
| Fibrous calcium silicate (%) | 20 | 10 | 20 | 30 | 10 | — | — | — |
| Mica (%) | — | — | — | — | — | 20 | — | — |
| Talc (%) | — | — | — | — | — | — | 20 | — |
| Calcium carbonate (%) | — | — | — | — | — | — | — | 20 |
| Tensile strength (kg/cm$^2$) | 460 | 550 | 560 | 540 | 850 | 610 | 550 | 500 |
| Heat distortion temperature (°C.) | 145 | 147 | 152 | 157 | 161 | 157 | 152 | 145 |
| Flexural modulus (kg/cm$^2$) | 38,000 | 41,000 | 46,000 | 50,000 | 57,000 | 52,000 | 45,000 | 37,000 |
| Izod impact strength (20° C., kg-cm/cm) | 3.5 | 4.4 | 4.3 | 4.2 | 6.0 | 3.5 | 3.4 | 3.1 |
| Weld tensile strength retention ratio (%) | 85 | 85 | 80 | 80 | 50 | 20 | 35 | 55 |
| Warpage (%) | 8 | 11 | 10 | 8 | 8 | 9 | 11 | 13 |

*Comparative Examples

TABLE 3

|  | Experiment No. | | | | |
|---|---|---|---|---|---|
|  | 12 | 13 | 14 | 15* | 16* |
| Modified PP-III (%) | 15 | 15 | 25 | 15 | 15 |
| Ethylene-propylene block copolymer (%) | 55 | — | 45 | 55 | 55 |
| Ethylene-propylene random copolymer (%) | — | 55 | — | — | — |
| Glass fiber (%) | 10 | 10 | 20 | 10 | 10 |
| Fibrous calcium silicate (%) | 20 | 20 | 10 | — | — |
| Talc (%) | — | — | — | 20 | — |
| Barium sulfate (%) | — | — | — | — | 20 |
| Tensile strength (kg/cm$^2$) | 530 | 500 | 830 | 530 | 480 |
| Heat distortion temperature (°C.) | 150 | 143 | 160 | 150 | 140 |
| Flexural modulus (kg/cm$^2$) | 44,000 | 40,000 | 55,000 | 43,000 | 35,000 |
| Izod impact strength | 7.5 | 4.5 | 13.0 | 6.5 | 6.5 |

TABLE 3-continued

| | Experiment No. | | | | |
|---|---|---|---|---|---|
| | 12 | 13 | 14 | 15* | 16* |
| (20° C., kg-cm/cm) | | | | | |
| Weld tensile strength retention ratio (%) | 75 | 75 | 50 | 20 | 55 |
| Warpage (%) | 10 | 10 | 7 | 9 | 11 |

*Comparative Examples

TABLE 4

| | Experiment No. | | | |
|---|---|---|---|---|
| | 17 | 18 | 19 | 20* |
| Modified PP-III (%) | 15 | 15 | 25 | — |
| Ethylene-propylene block copolymer (%) | 50 | 35 | 25 | 60 |
| Glass fiber (%) | 10 | 20 | 20 | 10 |
| Fibrous calcium silicate (%) | 20 | 10 | 10 | — |
| EPR (%) | 5 | 10 | 20 | 10 |
| Talc (%) | — | — | — | 20 |
| Tensile strength (kg/cm²) | 510 | 810 | 800 | 300 |
| Heat distortion temperature (°C.) | 150 | 155 | 150 | 110 |
| Flexural modulus (kg/cm²) | 42,000 | 49,000 | 41,000 | 19,000 |
| Izod impact strength (20° C., kg-cm/cm) | 9.0 | 17.6 | 21.5 | 4.3 |
| Weld tensile strength retention ratio (%) | 70 | 50 | 45 | 10 |
| Warpage (%) | 9 | 6 | 5 | 13 |

*Comparative Example

What is claimed is:

1. A molding composition comprising:
   (a) at least 50 wt.% of a polymer or copolymer of an alpha-olefin having from 2 to 4 carbon atoms, said polymer or copolymer being modified with an unsaturated carboxylic acid or derivative thereof;
   (b) between about 1 wt% and about 30 wt% of glass fiber; and
   (c) between about 5 wt% and about 40 wt% of fibrous calcium silicate; the concentration of said glass fibers and fibrous calcium silicate in the modified polyolefin being sufficient to substantially improve the weld tensile strength of the composition when molded.

2. The composition as defined in claim 1 wherein the modified polyolefin comprises a mixture of a major weight percent of an unmodified polyolefin and a minor weight percent of a propylene homopolymer or copolymer modified with an unsaturated carboxylic acid or derivative thereof.

3. The composition defined in claim 1 wherein the polyolefin is ethylene or propylene homopolymer or ethylene or propylene copolymer.

4. The composition as defined in claim 1 and further comprising an effective amount of an ethylene-α-olefin copolymer rubber to substantially increase the impact resistance of the composition when molded, the ethylene α-olefin copolymer rubber concentration in the composition being between 1 and 40 wt.%.

5. The composition as defined in claim 1 wherein the polyolefin is an ethylene-propylene copolymer.

6. The composition as defined in claim 1 wherein the polyolefin is polypropylene.

7. A molding composition comprising:
   (a) at least 50 weight percent of a polymer or copolymer of an α-olefin having from 2 to 4 carbon atoms, said polymer being modified with an effective amount of an unsaturated carboxylic acid;
   (b) a minor weight percent of fibrous filler material which comprises a mixture of glass fibers and fibrous calcium silicate, said glass fibers and fibrous calcium silicate synergistically combining to improve the tensile weld strength property of the composition when molded.

8. The molding composition as defined in claim 7 wherein the modified polymer or copolymer comprises a mixture of an unmodified polymer or copolymer of a $C_2$–$C_3$ α-olefin and a $C_2$–$C_3$ polymer or copolymer of an α-olefin reacted with an effective amount of an unsaturated carboxylic acid.

9. The molding composition as defined in claim 8 wherein the unmodified polymer or copolymer comprises the major weight proportion of the mixture.

10. The molding composition of claim 7 wherein the composition further comprises a minor weight percent of an ethylene-α-olefin copolymer rubber.

11. The molding composition of claim 1 wherein the polyolefin includes a propylene homopolymer and wherein the concentration of the glass fibers and fibrous calcium silicate in the composition is from 5 to 20 weight percent and from 10 to 30 weight percent, respectively.

12. The molding composition of claim 1 wherein the aspect ratio of the fibrous calcium siicate is from 3 to 30.

13. The molding composition of claim 4 wherein the copolymer rubber concentration in the composition is between 5 and 20 weight percent.

14. A molded article of thermoplastic comprising:
   (a) at least 50 wt.% of a polymer or copolymer of an alpha-olefin having from 2 to 4 carbon atoms, said polymer or copolymer being modified with an effective amount of an unsaturated carboxylic acid; and
   (b) a minor weight percent of fibrous filler material which comprises a mixture of glass fibers and calcium silicate, said filler materials combining synergistically to improve the tensile weld strength of the article.

* * * * *

UNITED STATES PATENT OFFICE
CERTIFICATE OF CORRECTION

Patent No. 4,417,019　　　　　　　　　Dated November 22, 1983

Inventor(s) Noboru Yamamoto et al

It is certified that error appears in the above-identified patent and that said Letters Patent are hereby corrected as shown below:

Cover page, [30] Foreign Application Priority Date, please delete the date "Jul. 9, 1981" and substitute therefor ---Sep. 7, 1981---

Signed and Sealed this

Twenty-seventh Day of November 1984

[SEAL]

Attest:

Attesting Officer

GERALD J. MOSSINGHOFF

Commissioner of Patents and Trademarks